United States Patent
Schramm et al.

(10) Patent No.: US 7,016,302 B1
(45) Date of Patent: Mar. 21, 2006

(54) APPARATUS AND METHOD FOR CONTROLLING QUEUING OF DATA AT A NODE ON A NETWORK

(75) Inventors: Karen M. Schramm, Needham, MA (US); Steven J. Schwartz, Sudbury, MA (US); Leo J. Keegan, Belmont, MA (US); Yuval Peduel, Sunnyvale, CA (US)

(73) Assignee: IronBridge Networks, Inc., Lexington, MA (US)

( * ) Notice: Subject to any disclaimer, the term of this patent is extended or adjusted under 35 U.S.C. 154(b) by 710 days.

(21) Appl. No.: 09/640,349

(22) Filed: Aug. 16, 2000

(51) Int. Cl.
*H04L 12/28* (2006.01)
*H04L 12/56* (2006.01)

(52) U.S. Cl. .............. 370/235; 370/395.2; 370/395.41; 370/414

(58) Field of Classification Search ................ 370/389, 370/395.1, 395.42, 395.43, 395.2, 395.21, 370/412, 413, 235, 395.41, 414
See application file for complete search history.

(56) References Cited

U.S. PATENT DOCUMENTS

| | | | |
|---|---|---|---|
| 5,463,620 A * | 10/1995 | Sriram | |
| 5,923,656 A * | 7/1999 | Duan et al. | 370/395.4 |
| 6,104,700 A * | 8/2000 | Haddock et al. | |
| 6,188,698 B1 * | 2/2001 | Galand et al. | 370/412 |
| 6,212,164 B1 * | 4/2001 | Murakami et al. | |
| 6,408,006 B1 * | 6/2002 | Wolff | |
| 6,438,134 B1 * | 8/2002 | Chow et al. | 370/412 |
| 6,470,016 B1 * | 10/2002 | Kalkunte et al. | 370/395.41 |
| 6,526,060 B1 * | 2/2003 | Hughes et al. | 370/395.4 |

* cited by examiner

*Primary Examiner*—Alpus H. Hsu
(74) *Attorney, Agent, or Firm*—Donald R. Boys; Central Coast Patent Agency, Inc.

(57) ABSTRACT

An approach to queuing data at a network switching node includes assigning a queue value such as a priority value or a weight to each of a plurality of queues which temporarily store data packets to be forwarded toward a link on the network. A bandwidth value related to a maximum amount of data to be transferred on the link is defined. A data limit value is assigned to each of the queues to limit the amount of data that can be forwarded from each queue. The data limit value is derived from the bandwidth value for the link. By placing bandwidth-related limits on the queues, low-priority queues are prevented from being dominated by high-priority queues, that is, low-priority queues are not prevented from forwarding their data by the priority structure. Also, the bandwidth-related limits allow for control of traffic flow to prevent overloading lower-capacity links on the network.

12 Claims, 3 Drawing Sheets

APPARATUS AND METHOD FOR CONTROLLING QUEUING OF DATA AT A NODE ON A NETWORK

FIELD OF THE INVENTION

The invention relates generally to the field of digital communications and more particularly to systems and methods for transferring packets of data in a switching node used in a digital data network and for controlling queuing of data at the switching node.

BACKGROUND OF THE INVENTION

Digital networks have been developed to facilitate the transfer of information including data and programs among digital computer systems and numerous other types of devices. A variety of types of networks have been developed and implemented using diverse information transfer methodologies. In modern networks, information is transferred through a mesh of switching nodes which are interconnected by communication links in a variety of patterns. The mesh interconnection pattern can allow for a number of paths to be available through the network from each computer system or other device to another computer system or other device.

Information transferred from a source device to a destination device is generally transferred in the form of fixed or variable-length data packets, each of which is in general received by a switching node over a communication link and transmitted over another communication link to facilitate transfer of the packet to the destination device or to another switching node along a path to the destination device. Each packet typically includes address information including a source address that identifies the device that generated the packet and a destination address that identifies the particular device or devices which are to receive the packet. Transfer of data packets on the network typically takes place in accordance with a packet transfer protocol. In common networks such as the Internet, a protocol used is the common Internet Protocol (IP).

Typically, a switching node includes one or more input ports, each of which is coupled to a communication link on the network to receive data packets, and one or more output ports, each of which is coupled to a communication link on the network to transmit packets. Each node typically also includes a switching fabric that couples data packets from the input ports to the output ports for transmission.

A typical switching node also includes one or more packet queues at the input and/or output side of the node for temporarily storing packets that are to be transferred onto the network. Input-queued switches have the queues at the input ports, and output-queued switches have the queues at the input ports. In either case, each link to which an output port is coupled can be associated with multiple queues.

The configuration of the queuing structure is determined by the queuing approach implemented in the node. For example, under a priority queuing approach, the queues associated with a particular output can be defined according to a predetermined packet transfer priority scheme. One queue may be assigned to store only the highest priority packets. Another queue may store only the next highest level priority packets, and so on. When a packet is to be transferred onto the associated network link, if a packet is stored in the highest priority queue, then that packet is transferred. If no packet is present in that queue, then the next queue is checked, and so on. This approach ensures that the highest priority packets will always be transferred first.

In a weighted queuing approach, such as Weighted Fair Queuing (WFQ), each queue is given a predetermined weight value. Packets are then transferred out of the queues according to their weights. For example, in a system with four queues for an output port, a weighting scheme can be used in which the four queues are assigned weight values of 8, 4, 2, and 2. The queue with the weight value of 8 is permitted to forward 8/16 or one half of the total traffic on the associated link. The queue with the weight of 4 can forward one fourth of the traffic on the link. In such a system, if one of the queues has no traffic, then its permitted traffic is allocated among the remaining queues. For example, if the one of the queues with a weight of 2 has no traffic, then the queue with the weight of 8 can now transfer 8/14 of the total allowed link traffic.

In systems which implement one or both of these packet queuing approaches, it is possible that packets with relatively low priority will never be transferred, or will be substantially delayed, if the traffic of higher-priority packets is high. It is also possible that the amount of traffic permitted to be transferred from the queues on the link may exceed the capabilities of other lower-capacity links on the network, such as those carrying edge router data traffic.

SUMMARY OF THE INVENTION

A queuing approach according to the present invention provides a limitation on the amount of data traffic that can be taken from a single data queue in a switching node such that lower-priority packets will be allowed to be transferred out of the node and the overall traffic rate out of each of the queues in the node can be limited to a predetermined level. Limitations placed on the traffic out of the node can be based on a predetermined maximum data rate, i.e., bandwidth, of a link on the network to which the node is coupled.

The present invention is directed to an apparatus and method for controlling data traffic at a node on a network. The node includes at least one output coupled to at least one link on the network. A bandwidth value is defined for the at least one link and is related to a maximum amount of data to be transferred on the link. A plurality of queues are provided for storing data to be transferred on the link. Each queue is assigned a queue value which is related to a preference for transferring data from the queue to the link. In addition, each queue is also assigned a data limit value used to limit the amount of data that can be transferred out of the queue to the link. The data limit value is derived from the bandwidth value defined for the link. In one particular embodiment, the data limit value assigned to each queue is related to a percentage of the bandwidth value.

The link whose bandwidth value is used to apply limits to the queues can be the link that is directly connected to the output of the switching node. Alternatively, it can be any selected link on the network toward which packets are to be transferred and whose traffic carrying capacity is to be considered. For example, the link may carry traffic for a router near an edge of the network. As such, its traffic carrying capacity may be relatively low when compared to that of a core link. In this case, applying limits related to the bandwidth of the link to the queues in accordance with the invention can prevent this relatively distant link from being overloaded.

In one embodiment, the invention implements an improved priority queuing approach. In this embodiment, the queue values assigned to the queues are priority values, each of which defines a packet transfer priority for its associated queue. Hence, in this embodiment, the invention applies a data traffic limit based on a predetermined link bandwidth value to each queue in addition to packet transfer priority values assigned to each queue.

In another embodiment, the invention implements an improved weighted queuing approach. In this embodiment, each of the queue values defines a weight for its assigned queue, and the weights are used in determining which packets should be transferred out of the queues. Hence, in this embodiment, the invention applies a data traffic limit based on a predetermined link bandwidth value to each queue in addition to packet transfer weight values assigned to each queue.

The present invention provides advantages over prior approaches to controlling queuing of data such as priority queuing and weighted queuing. For example, the bandwidth-related limitation on each queue prevents higher-priority queues in a priority-based queuing approach from dominating lower-priority queues to the extent that the lower-priority queues are unable to transfer data efficiently. By applying a limit related to the bandwidth of the link toward which packets are being transferred, high-priority queues are prevented from transferring all of their packets without limit, regardless of the condition of lower-priority queues. As a result, the lower-priority queues are allowed to transfer their data more efficiently. Also, the bandwidth-related limitation allows for control of traffic such that lower-capacity links are not overloaded.

The invention is applicable in various types of networks. For example, the invention can be implemented in a switching node such as the one described in copending U.S. patent application Ser. No. 09/108,771, filed on Jul. 2, 1998, entitled "System and Method for Switching Packets in a Network," by Schwartz, et al., and assigned to the same assignee as the present application. The contents of that application are incorporated herein in their entirety by reference.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS OF THE INVENTION

Figure 1:
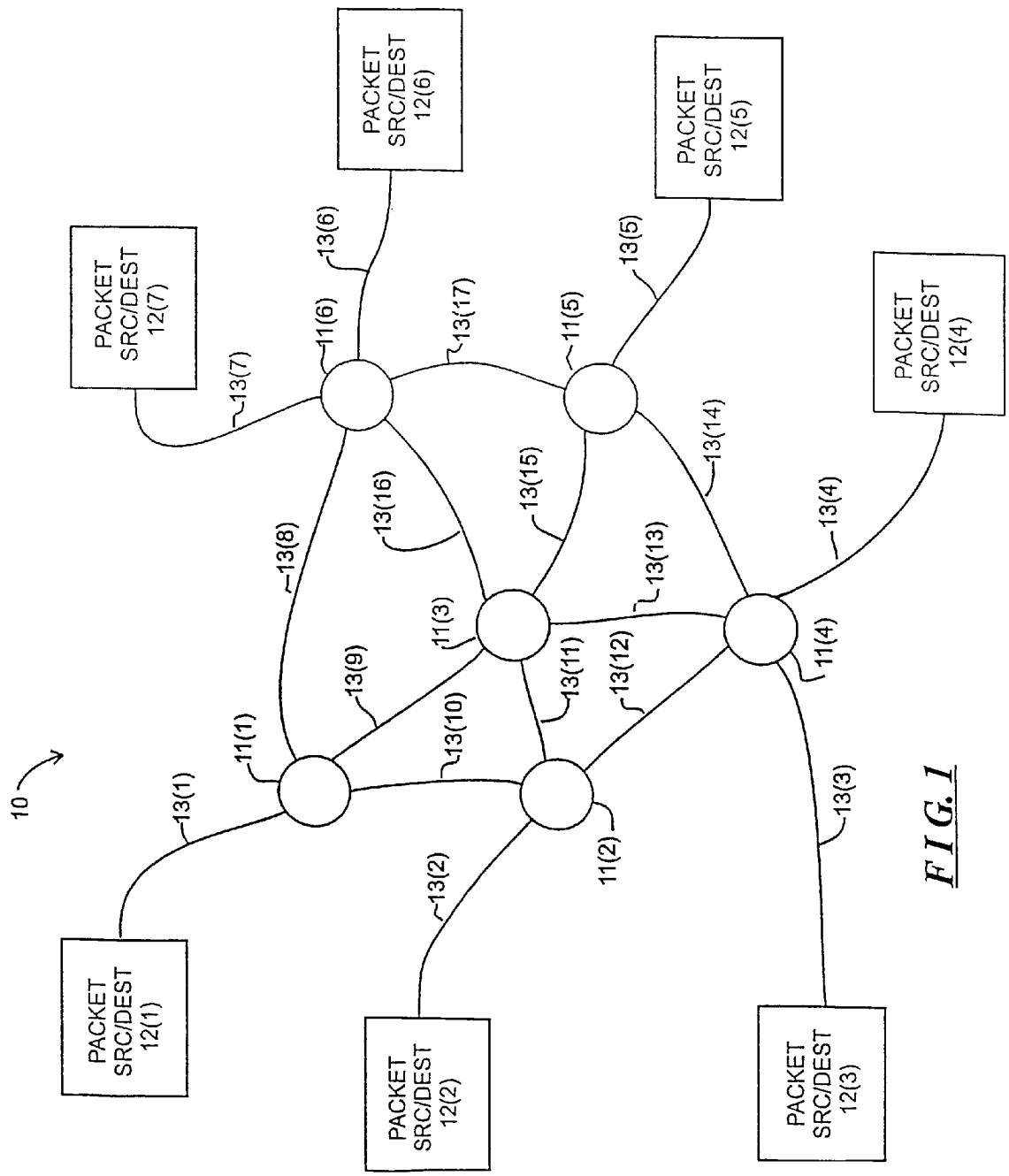
FIG. 1 contains a schematic diagram of a network including a plurality of switching nodes in accordance with the present invention.

FIG. 1 schematically depicts a computer network 10 including a plurality of switching nodes 11(1) through 11(N), generally identified by reference numeral 11, for transferring signals representing data among a number of devices, which in FIG. 1 are represented by packet source/destination devices 12(1) through 12(M), generally identified by reference numeral 12, in a wide area network ("WAN"). The packet source/destination devices 12 can include a particular device such as a computer system or other device that stores, generates, processes or otherwise uses digital data. It can also be a local area network of such devices. Each packet source/destination device 12 is connected over a communication link, generally identified by reference numeral 13, to a switching node 111 to facilitate transmission of data thereto or the reception of data therefrom.

The switching nodes 11 are interconnected by communication links, also generally identified by reference numeral 13, to facilitate the transfer of information among the switching nodes. The communication links 13 may utilize any convenient information transmission medium, including, for example, wires for carrying electrical signals, optical fiber links for carrying optical signals, and so forth. Each communication link 13 is preferably bidirectional, allowing the switching nodes 11 to transmit and receive signals among each other and with customer premises equipment 12 connected thereto over the same link. Depending on the particular type of medium selected for respective communication links 13, multiple media may be provided for transferring signals in opposite directions thereby to provide the bidirectional link.

Data are transferred in the network 10 in the form of packets. Generally, a packet includes a header portion and a data portion. The header portion includes information that assists in routing the packet through the network, with the specific information depending on the particular packet routing protocol that is used in routing packets through the network. In connection with network 10, any of a number of well-known packet routing protocols may be used; in one embodiment, the well-known Internet protocol ("IP") is used. In any case, the header typically includes address information including a source address identifying the particular source device $12(m_S)$ that generated the packet and a destination address identifying the particular destination address $12(m_D)$ that is to receive the packet. A packet may be of variable length and the header typically also includes length information to identify the length of the packet. The header also typically includes other information, including, for example, protocol identifier information that identifies the particular protocol that defines the structure of the packet. The data portion contains the data payload of the packet. The packet may also include, as part of the data portion or otherwise, error detection information that can be used to determine whether an error occurred in transferring the packet.

A source device $12(m_D)$, after generating a packet for transfer to a destination device $12(m_D)$, provides the packet to the switching node $11(n)$ to which it is connected. The switching node $11(n)$ uses the destination address in the packet to attempt to identify a route over which it is to transfer the packet to forward the packet to either the destination device $12(m_D)$, if the switching node $11(n)$ is connected to the destination device $12(m_D)$, or to another switching node $11(n)(n' \approx n)$ along a path to the destination device $12(m_D)$. The route associates a destination address with one of the communication links 13 connected to the switching node. If the switching node can identify a route for the received packet, it will forward the packet over the communication link identified by the route. Each switching node $11(n)$, $11(n'')$, ... that receives the packet will perform a similar operation. If all of the switching nodes have respective routes for the destination address, the packet will eventually arrive at the destination device $12(m_D)$.

Figure 2:
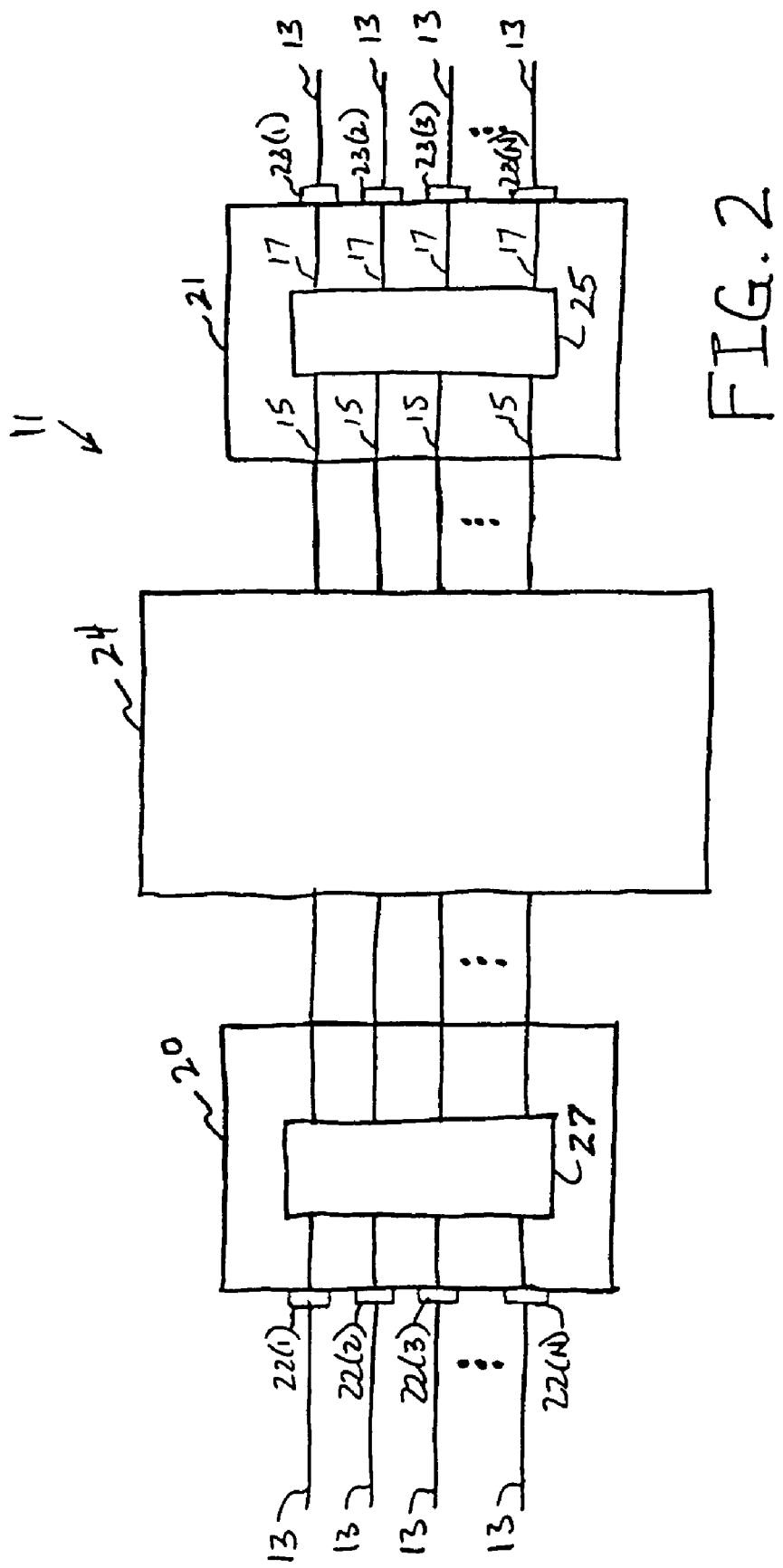
FIG. 2 contains a schematic block diagram of a switching node in accordance with the present invention.

FIG. 2 is a schematic block diagram of one embodiment of a switching node 11 in accordance with the present invention. The node 11 in general includes one or more input port modules 20 and one or more output port modules 21. The input port module 20 and output port module 21 are connected to processing circuitry and switching fabric 24 which controls forwarding of data from the input port module 20 to the output port module 21. In general, each input port module 20 includes one or more input ports 22(1) through 22(N), which can be connected to communication links 13. Likewise, each output port module 21 includes one or more output ports 23(1) through 23(N) which can in general be connected to multiple communication links 13. Data received on each of the links 13 are forwarded from the associated input port 22 of the input port module 20, across the processing circuitry and switching fabric 24, to the appropriate output port 23 of the output port module 21 and out onto the network on the appropriate link 13.

As shown in FIG. 2, the input port module 20 and the output port module 21 can also include queuing circuitry 27 and 25, respectively, in accordance with the present invention. In the description of the invention contained herein, the invention will be described in terms of an output port module 21 with the queuing circuitry 25. It will be understood that the queuing circuitry 25 need not be located in the output port module 21 and also that the invention is applicable to any queuing circuitry used to store packets being transferred on a network.

The queuing circuitry 25 is used to queue data arriving at the output port module 21 from the processing circuitry and switching fabric 24. The queuing circuitry 25 temporarily stores data packets before they are transferred to network communication links 13 via output ports 23. Data packets are transferred to the queuing circuitry 25 on lines 15. Data packets out of the queuing circuitry 25 are forwarded to the output ports 23 on lines 17.

Figure 3:
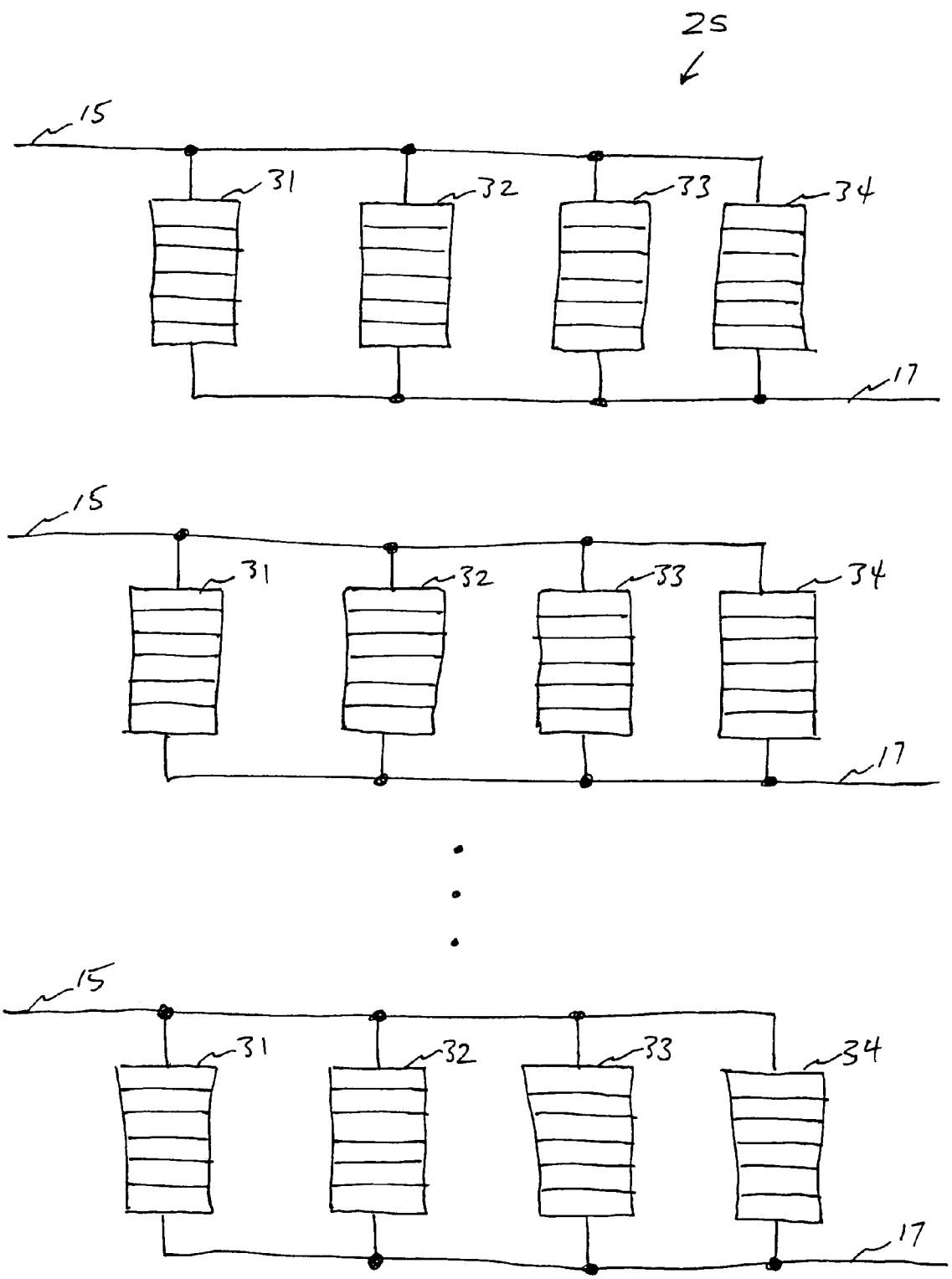
FIG. 3 contains a schematic block diagram of one embodiment of queuing circuitry in accordance with the invention.

FIG. 3 is a schematic block diagram of one embodiment of the queuing circuitry 25 shown in the output port module 21 in FIG. 2. As shown in FIG. 3, each output line 17 from the queuing circuitry is associated with one or more queues 31, 32, 33, 34. In the particular exemplary embodiment shown in FIG. 3 and described herein, four queues 31, 32, 33, 34 are associated with each output line 17. It will be understood that any number of queues can be associated with an output. Also, each output need not be associated with the same number or type of queue.

The function of each queue is determined by the queuing approach implemented for the particular associated output. One possible queuing approach to which the invention is applicable is priority queuing, in which each queue is assigned a particular priority value. For example, using priority queuing, the queues 31–34 can be assigned priority numbers 1–4, respectively, with 1 representing the highest priority queue and 4 representing the lowest priority queue. Each packet is associated with a priority value. For example, in one or more common network protocols, each packet carries what is commonly referred to as a "discard eligibility" (DE) value, which identifies the packet's priority for discard, i.e., for not being transferred out of the node onto the network. Typically, packets with high DE values are considered more likely to be discarded, and therefore have lower priority, than packets with low DE values. Therefore, in one form of priority queuing, packets with higher DE values are temporarily stored in the lower priority queues, e.g., the queue assigned priority 4, and packets with low DE values are stored in the higher priority queues, e.g., the queue assigned priority 1.

Under a conventional priority queuing approach, when a packet is to be removed from a queue for transfer onto the network, the highest priority queue, i.e., the queue with priority value 1, is checked first for data. One or more packets in that queue are transferred onto the network. If no packets are stored in that queue, then the next priority queue, i.e., the queue with value 2, is checked, and any packets stored in that queue are transferred. This continues until no more packets can be presently transferred onto the network or the queue with priority 4 is reached.

It will be appreciated that, under this approach, it can occur that the priority 4 queue is not reached, and, as a result, none of the lower priority packets are forwarded. This can occur in particular during high-traffic bursts of higher-priority traffic. While it is desirable that all of the higher-priority traffic be forwarded, it is not desirable to have very little or none of the lower-priority traffic forwarded through the node.

To address this problem, in accordance with the invention, all of the queues can be limited in the amount of traffic they can send. In one embodiment, the limitation is based on the bandwidth of a link on the network. The link can be any link such as the link to which the associated output is connected or a link on the network having lower capacity than the local links. In one embodiment, the bandwidth-based limitations are expressed as a percentage of the bandwidth value associated with the pertinent link. For example, in one particular configuration, the queues can be assigned percentages of the bandwidth and priority values according to Table 1 below.

TABLE 1

| Queue Reference Numeral | 31 | 32 | 33 | 34 |
|---|---|---|---|---|
| Priority | 1 | 2 | 3 | 4 |
| Bandwidth Percentage | 10 | 40 | 80 | 80 |

As shown in Table 1, queue 31 has the highest priority, and packets are taken from queue 31 first for transfer onto the network. However, that priority is limited to the extent that the packet traffic taken from queue 31 cannot exceed 10 percent of the bandwidth of the link. Therefore, packets will be taken from queue 31 up to the 10 percent limit. When that limit is reached, packets will be taken from queue 32 next. If there are no packets in queue 32, or if the 40 percent limit of queue 32 is reached, then packets will be taken from queue 33. If there are no packets left in queue 33, or if the 80 percent limit of queue 33 is reached, then packets will be taken from queue 34.

Thus, in accordance with this improved priority queuing approach of the invention, packets from all of the queues will in general be permitted to be forwarded onto the network. In particular, lower-priority traffic will still be forwarded, even in the presence of high-traffic bursts of higher-priority traffic. The bandwidth-constrained queuing approach of the invention provides for this while still maintaining the predetermined priority scheme of the system.

It should be noted that this bandwidth-based limitation of the invention is preferably applied to a queue only when there is traffic suitable for transmission from some other queue associated with the same output link. That is, the bandwidth limit is preferably not applied if no other traffic from any other queue is waiting for transmission. This approach avoids the potential for under-utilization of the link when no traffic is waiting.

In another embodiment, the invention is applicable to a packet fair queuing approach such as weighted fair queuing (WFQ) to provide an improved weighted queuing approach with bandwidth-related constraints similar to those described above. Referring again to FIG. 3, under a weighted queuing approach, each of the queues is assigned a weight value used to indicate its relative importance with respect to the other queues. For example, the queues 31, 32, 33, 34 can be assigned the weights 8, 4, 2, 2, respectively. Since the total of the weights is 16, queue 31 can forward 8/16, or one half, of the total traffic on the associated output. Queue 32 can forward 4/16, or one eighth, and queues 33 and 34 each can forward one eighth of the total traffic.

In such a system, when one of the queues has no traffic, that queue's traffic capacity is allocated among the other queues. For example, if queue 33 has no traffic, then the total of the weights becomes 14, and the amount of traffic permitted to be forwarded by each of the other queues increases. For example, under these conditions, queue 31 can now forward 8/14 of the total data traffic capacity. Thus, the amount of traffic carried by the queues can increase substantially, especially if one of the queues experiences a burst in traffic. This can be an especially serious problem if a highly-weighted queue, such as queue 31 in FIG. 3, experiences a significant traffic burst, since links on the network can be overloaded.

This can be the situation where the queues are in a switching node at the core of the network and are weighted to provide traffic on links with very high capacity. The traffic being forwarded may be intended to be sent to an edge router via some other downstream link that does not have the same traffic handling capacity. For example, the local core link may have a 2.4 Gbits/sec capacity or bandwidth. However, the edge link to which a portion of the traffic is to be forwarded may only have a 0.6 Gbits/sec bandwidth. Traffic out of the core switching node intended for that lower-capacity link should be limited to prevent overloading the distant link.

In accordance with the present invention, the traffic is limited at the core switching node by placing additional traffic limits on the relevant queues. These additional limits are based on a percentage of the link bandwidth value as described above to ensure that links are not overloaded. In one embodiment, the bandwidth value used to derive the limits is the bandwidth value of the local core link. In the example described above, the pertinent queue may be limited to 25 percent of the total local link capacity such that the remote lower-capacity link is not overloaded. In an alternative embodiment, the limit is based on a percentage of some other link such as the remote lower-capacity link.

Table 2 illustrates a general example of the bandwidth-constrained limits applied to the weighted queues in the improved weighted queuing approach of the invention.

TABLE 2

| Queue Reference Numeral | 31 | 32 | 33 | 34 |
|---|---|---|---|---|
| Weight | 8 | 4 | 2 | 2 |
| Traffic Allocation | 8/16 | 4/16 | 2/16 | 2/16 |
| Bandwidth Percentage | 80 | 50 | 50 | 25 |

As shown in Table 2, each queue is permitted to forward traffic according to its weighted traffic allocation, up to the bandwidth constraint imposed in accordance with the invention. That is, in the illustrated example, queue 31 can forward one half of the total output traffic, as long as it does not exceed 80 percent of the bandwidth of the relevant link. Queue 32 can forward one fourth of the traffic up to 50 percent of the bandwidth, queue 33 can forward one eighth of the traffic up to 50 percent of the bandwidth, and queue 34 can forward one eighth of the traffic up to 25 percent of the bandwidth.

The additional bandwidth constraints apply even if the amount of traffic allocated to the queues increases because one or more of the queues has no traffic. This ensures that the link whose bandwidth is being used to derive the limits will not be overloaded, regardless of how traffic is allocated among the queues.

It should be noted that the link bandwidth value used to derive the limits can in general differ from queue to queue. That is, multiple queues for the same output can have bandwidth constraints derived from the bandwidths of different links, because, in general, queues can be assigned to store packets intended for transfer to particular links.

Also, as in the previously described embodiment, the limitations are preferably only applied to a queue when there is traffic waiting in another queue for transmission on the relevant link.

It should also be noted that the particular values, such as priority values, weights and bandwidth percentage constraints set forth herein are intended to serve as illustrative examples only and not as limiting particular configurations of the invention described herein. It will be understood that many combinations of values for any of these variables are possible, based on the particular packet transfer and queuing environment in which the invention is implemented.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of controlling data traffic at a node on a network, said node having at least one output coupled to at least one link on the network, said method comprising:

defining a bandwidth value for the at least one link related to a maximum amount of data to be transferred on the link;

providing a plurality of queues for storing data to be transferred on the at least one link;

assigning a queue value to each of the plurality of queues, each of said queue values being related to a preference for transferring data from its assigned queue onto the link; and assigning a data limit value to each of the plurality of queues, an amount of data being transferred onto the link from each queue being limited by the data limit value assigned to the queue, and each of said data limit values being derived from the bandwidth value for the at least one link, wherein if one of the plurality of queues has no data traffic, said queue's data traffic capacity is allocated among the other queues;

characterized in that the queue value is selectively assigned to a specific queue based on preferences for transferring the data from its assigned queue onto the link, and further characterized in that after the initial queue value assignment, further changes to the queue value for each queue may be selectively changed based on other preferences for transfer of the data onto the link.

2. The method of claim 1, wherein the queue values are priority values, each priority value defining a priority for transferring data stored in the associated queue onto the link.

3. The method of claim 2, wherein each of the data limit values assigned to the queues is related to a percentage of the bandwidth value.

4. The method of claim 1, wherein each of the queue values defines a weight for its assigned queue, the plurality of queues transferring data onto the link according to the weights of the plurality of queues.

5. The method of claim 4, wherein each of the data limit values assigned to the queues is related to a percentage of the bandwidth value.

6. The method of claim 1, wherein each of the data limit values assigned to the queues is related to a percentage of the bandwidth value.

7. An apparatus for controlling data traffic at a node on a network, comprising:
- an output interface coupled to at least one link on the network for transferring data toward the at least one link, the at least one link being associated with a bandwidth value related to a maximum amount of data to be transferred on the link;
- a plurality of queues for storing data to be transferred via the output interface; and
- at least one processor for (i) assigning a queue value to each of the plurality of queues, each of said queue values being related to a preference for transferring data from its assigned queue onto the link, and (ii) assigning a data limit value to each of the plurality of queues such that an amount of data being transferred onto the link from each queue is limited by the data limit value assigned to the queue, each of said data limit values being derived from the bandwidth value for the at least one link (iii) reallocating the data limit value from at least one of said plurality of queues among the other queues when the at least one queue has no data traffic;
- characterized in that the queue value is selectively assigned to a specific queue data based on preferences for transferring the data from its assigned queue onto the link, and further characterized in that after the initial queue value assignment, further changes to the queue value for each queue may be selectively changed based on other preferences for transfer of the data onto the link.

8. The apparatus of claim 7, wherein the queue values assigned by the at least one processor are priority values, each priority value defining a priority for transferring data stored in the associated queue onto the link.

9. The apparatus of claim 8, wherein each of the data limit values assigned by the at least one processor is related to a percentage of the bandwidth value.

10. The apparatus of claim 7, wherein:
- each of the queue values assigned by the at least one processor defines a weight for its assigned queue; and
- the plurality of queues transfers data onto the link according to the weights of the plurality of queues.

11. The apparatus of claim 10, wherein each of the data limit values assigned by the at least one processor is related to a percentage of the bandwidth value.

12. The apparatus of claim 7, wherein each of the data limit values assigned by the at least one processor is related to a percentage of the bandwidth value.

* * * * *